United States Patent [19]

Rose et al.

[11] Patent Number: 5,008,049

[45] Date of Patent: Apr. 16, 1991

[54] METHOD FOR SEALING AN ELECTRONIC DEVICE CONTAINING A FLUID MATERIAL

[75] Inventors: James W. Rose, Delmar; Theresa A. Sitnik, Scotia, both of N.Y.

[73] Assignee: General Electric Company, Schenectady, N.Y.

[21] Appl. No.: 410,398

[22] Filed: Sep. 21, 1989

[51] Int. Cl.$^5$ .................. B29C 39/38; B29C 39/10
[52] U.S. Cl. .................. 264/4; 156/244.17; 156/303.1; 156/308.2; 264/22; 264/25; 264/249; 264/261
[58] Field of Search ............ 156/107, 244.17, 303.1, 156/308.2; 264/261, 25, 249, 248, 4, 22, 24; 350/343, 344, 320

[56] References Cited

U.S. PATENT DOCUMENTS

| | | | |
|---|---|---|---|
| 2,330,497 | 9/1943 | Larmour | 156/303.1 |
| 3,953,932 | 5/1976 | Graves | 156/303.1 |
| 3,967,882 | 7/1976 | Kubota et al. | 350/343 |
| 4,226,509 | 10/1980 | Jacobs | 350/343 |
| 4,390,245 | 6/1983 | Shimizu et al. | 350/343 |
| 4,482,511 | 11/1984 | Komatsubara | 264/22 |
| 4,494,825 | 1/1985 | Sasaki et al. | 350/343 |
| 4,610,510 | 9/1986 | Funada et al. | 350/343 |
| 4,640,583 | 2/1987 | Hoshikawa et al. | 350/343 |
| 4,752,498 | 6/1988 | Fudim | 264/22 |
| 4,820,025 | 4/1989 | Nakanowatari | 350/343 |

FOREIGN PATENT DOCUMENTS

| | | | |
|---|---|---|---|
| 0050251 | 4/1977 | Japan | 350/343 |
| 0041488 | 3/1980 | Japan | 350/343 |
| 0032124 | 4/1981 | Japan | 350/343 |
| 0014823 | 1/1982 | Japan | 350/343 |
| 0161723 | 10/1982 | Japan | 350/343 |
| 0149322 | 8/1984 | Japan | 350/343 |
| 0188521 | 8/1986 | Japan | 156/107 |
| 0200228 | 8/1989 | Japan | 350/343 |
| 2064155 | 6/1981 | United Kingdom | 350/343 |

OTHER PUBLICATIONS

Edmonds et al., "Liquid Crystal Cell Filling", IBM Technical Disclosure Bull., vol. 16, No. 2, Jul. 1973.

Primary Examiner—Willard Hoag
Attorney, Agent, or Firm—Marvin Snyder; James C. Davis, Jr.

[57] ABSTRACT

A device containing a fluid material is sealed by sealant material placed essentially completely around the periphery of the device to join spaced apart first and second members of the device; and aperture is formed through the seal and the device interior is evacuated. Then fluid material is introduced into the device interior through the aperture and only a limited region of the device, confined substantially to the aperture is exposed to electromagnetic radiation from a laser or the like, to hermetically close the aperture when a photoreactive adhesive is injected into the aperture to cause the adhesive to solidify when contacted by the electromagnetic radiation. In an alternate embodiment, the aperture is filled with a plug of thermoplastic material, which is then selectively heat treated by a laser or the like to cause the plug to bind to the aperture boundary and hermetically enclose the fluid material.

24 Claims, 5 Drawing Sheets

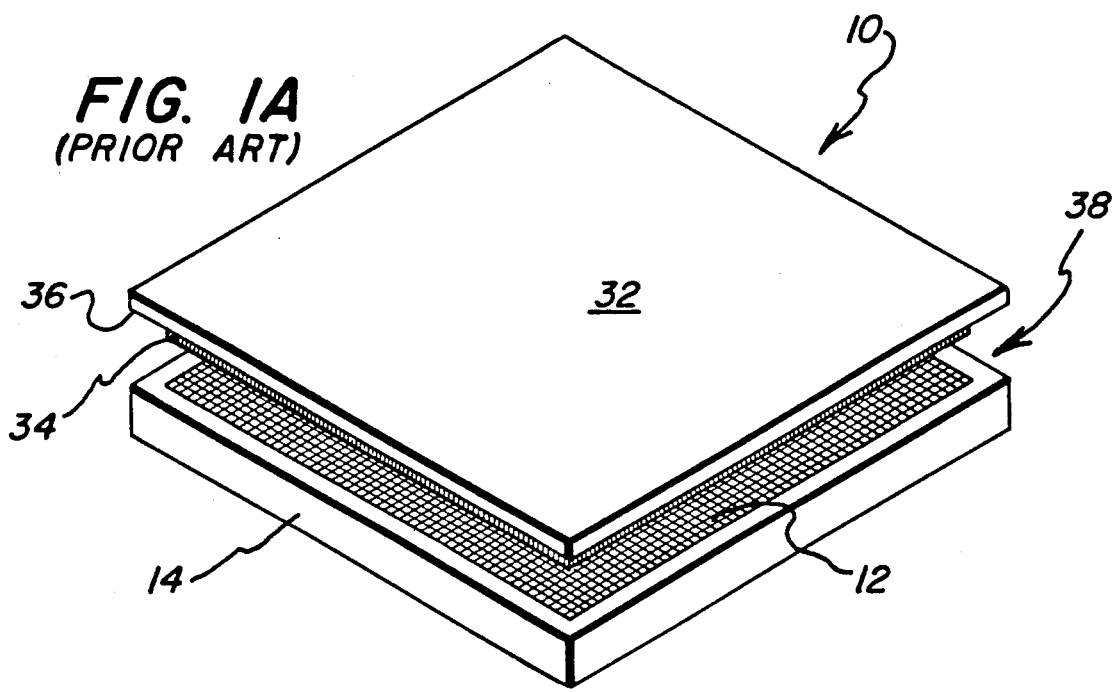
FIG. IA
(PRIOR ART)
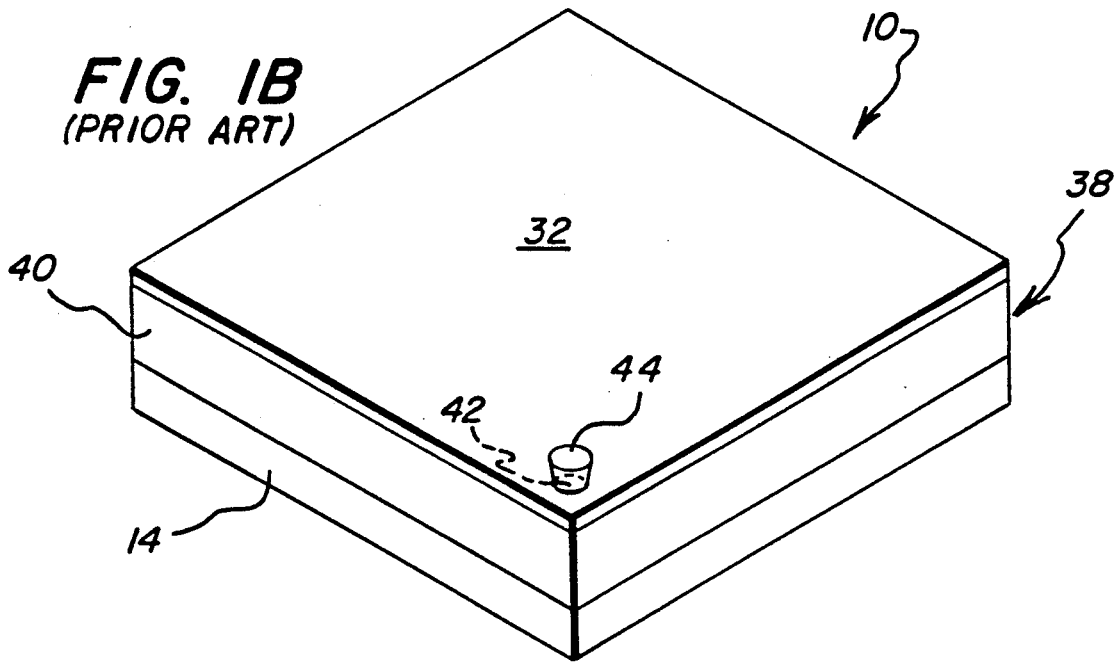
FIG. IB
(PRIOR ART)

METHOD FOR SEALING AN ELECTRONIC DEVICE CONTAINING A FLUID MATERIAL

BACKGROUND OF THE INVENTION

The present invention relates to liquid crystal display (LCD) devices and, more particularly, to an improved method for sealing the peripheral edges of an LCD device to retain the liquid crystal material therein.

One example of an electronic device which is filled with a fluid is an LCD device An LCD device typically comprises a multiplicity of picture elements, or "pixels", formed between a pair of flat panels (usually a glass substrate and a coverglass) sealably containing a quantity of liquid crystal material, such as a dichroic dye guest/host system or a twisted nematic formulation. If the LCD device is to operate by reflected light, only one of the panels need be transparent and the other panel will be formed with a reflective surface. If the LCD device is to be light transmissive, then both flat panels should be transparent.

A detailed description of an LCD device structure and operation is disclosed and claimed in U.S. Pat. No. 4,565,424, issued Mar. 3, 1987, assigned to the assignee of the present invention, and incorporated herein in its entirety by reference. Briefly described, an LCD device may be fabricated by disposing a plurality of electrodes, formed from a transparent conductive material, such as indium tin oxide (ITO) or the like, on one of the flat panels (glass substrate); the electrodes will usually be arranged in uniform columns and rows to form an X-Y matrix structure. These electrodes are generally referred to as "pixel" electrodes. A semiconductor switch, such as a thin-film field-effect transistor (FET) or the like, is integrally formed with each pixel electrode to control operation of that pixel in the display. Electrical communication with the individual pixel FETs is accomplished by a plurality of X-address lines or scan lines and a plurality of Y-address lines or data lines which are both formed during device fabrication. A layer of light transmissive passivation material, such as silicon oxide or the like, is typically formed over each FET and corresponding pixel electrode. The second flat panel (coverglass) will have conductive material disposed on, and substantially completely covering, an inner surface to form a "ground plane electrode." The ground plane electrode will be made from ITO or the like if the display is to be light transmissive. The coverglass will be disposed over the FETs and pixel electrodes with the ground plane electrode facing the FETs and pixel electrodes; the coverglass will typically be spaced from each FET structure by a mechanical spacer such as glass fibers, glass beads or the like disposed over the FET. The mechanical spacer causes a gap between the glass substrate and the coverglass. The glass substrate and coverglass are joined together at the peripheral edges of the device by applying a sealant/adhesive material, such as epoxy or the like, to the peripheral edges of the coverglass and then disposing the coverglass over the substrate in alignment therewith. The sealant material should fill the gap between the glass substrate and the coverglass at the periphery of the device. The device is then heat treated to cure the epoxy. The seal may extend essentially completely around the periphery of the device and an aperture or window may be formed at a corner or in a side edge of the device for later injection of the liquid crystal material. If the seal extends completely around the device periphery to hermetically seal the interior of the device, an opening or window may then be etched through the coverglass and ground plane electrode by known techniques to facilitate injection of the liquid crystal material into the interior of the device. After the epoxy seal is heat cured, the interior of the LCD device is evacuated and then the liquid crystal material is injected with a syringe or the like through the etched opening in the coverglass or through the window in the epoxy seal at a corner or in a side edge of the device. The liquid crystal material will migrate throughout the device and fill the voids between the plurality of pixel electrodes and the ground plane electrode. When the device is filled, the etched opening or side window is closed with an epoxy-type material or the like. These materials have a tendency to partially permeate the liquid crystal material immediately adjacent to the opening or window and thus contaminate this nearby liquid crystal material. This is a particularly troublesome problem when the opening is plugged with an epoxy-type material which is heat cured; the epoxy-type materials typically contain a solvent which has a very high tendency to disperse into the liquid crystal material and contaminate a substantial area of the display immediately around the opening. These contaminants can adversely affect the optical and electrical characteristics of the liquid crystal material in the contaminated area.

This problem becomes exacerbated as the size of liquid crystal display devices increases because the opening through which the liquid crystal material is inserted is typically made larger to facilitate efficient injection of the material during the fabrication process. The method where an opening is etched in the coverglass and ground plane electrode is typically only used for displays smaller than about 4"×4", because a small opening can be used that does not take up valuable display area; and the other method, where a window or aperture is formed in the peripheral edge seal (preferably at a corner of the device), is used for larger devices because a larger aperture can be formed in the edge seal without reducing the display area. Since the aperture is larger, more epoxy-type material must be used to close it and a larger area of the display proximate to the aperture may become contaminated by solvents and the like. Additionally, the liquid crystal material is preferably filled from a single aperture. If the liquid crystal material were filled through multiple small apertures, which individually would not require much epoxy-type filling material, the liquid crystal cell may be subjected to greater overall contamination.

It is accordingly a primary object of the present invention to provide a novel method for sealing an LCD device or the like which is not subject to the foregoing disadvantages.

It is a further object of the present invention to provide a method for selectively forming, in a localized area, a seal or plug which does not contaminate or otherwise impair the performance of an LCD device.

It is an additional object of the present invention to provide a noncontaminating edge seal for an LCD device which can withstand wide temperature and humidity variations without loss of adhesion or cracking.

These and other objects of the invention, together with the features and advantages thereof, will become apparent from the following detailed specification when read with the accompanying drawings.

SUMMARY OF THE INVENTION

In accordance with the present invention, a method for sealing an LCD device comprises the steps of: forming an essentially continuous seal, with a sealant material, around the periphery of the LCD device between a substrate plate and a cover plate of the device; forming an aperture in the seal; filling the LCD device with liquid crystal material through the aperture; filling the aperture with a plug of thermoplastic material; and heating a zone of the device containing substantially only the thermoplastic plug to seal the device and to prevent thermoplastic material from migrating substantially beyond the zone. The zone where the plug is located is preferably heated by irradiation with an argon-ion laser operating at a wavelength of about 351 nm. and about 200 mW. power. The plug material may be an injection-moldable thermoplastic, such as Lexan ® resin or Ultem ® resin manufactured by the General Electric Company, or a like material.

In a presently preferred embodiment, after the LCD device is filled with liquid crystal material through the aperture, radiation from a laser, such as an argon-ion laser or the like, is focused on a limited region of the LCD device surface corresponding substantially to the aperture. While the aperture is irradiated, a photoreactive optical adhesive/sealant (such as Norland "UVS91"), a photoreactive epoxy or the like, is injected into the aperture and solidifies when irradiated by the laser light. The laser light confines the optical adhesive to the irradiated region to prevent dispersion of any adhesive into the liquid crystal material nearby the aperture. The size of the region irradiated by the laser may be controlled by focusing the laser light through a lens.

BRIEF DESCRIPTION OF THE DRAWINGS

FIGS. 1A and 1B are perspective views of the steps employed in a conventional method for sealing an LCD device.

DETAILED DESCRIPTION OF THE PREFERRED EMBODIMENTS

Figure 2:
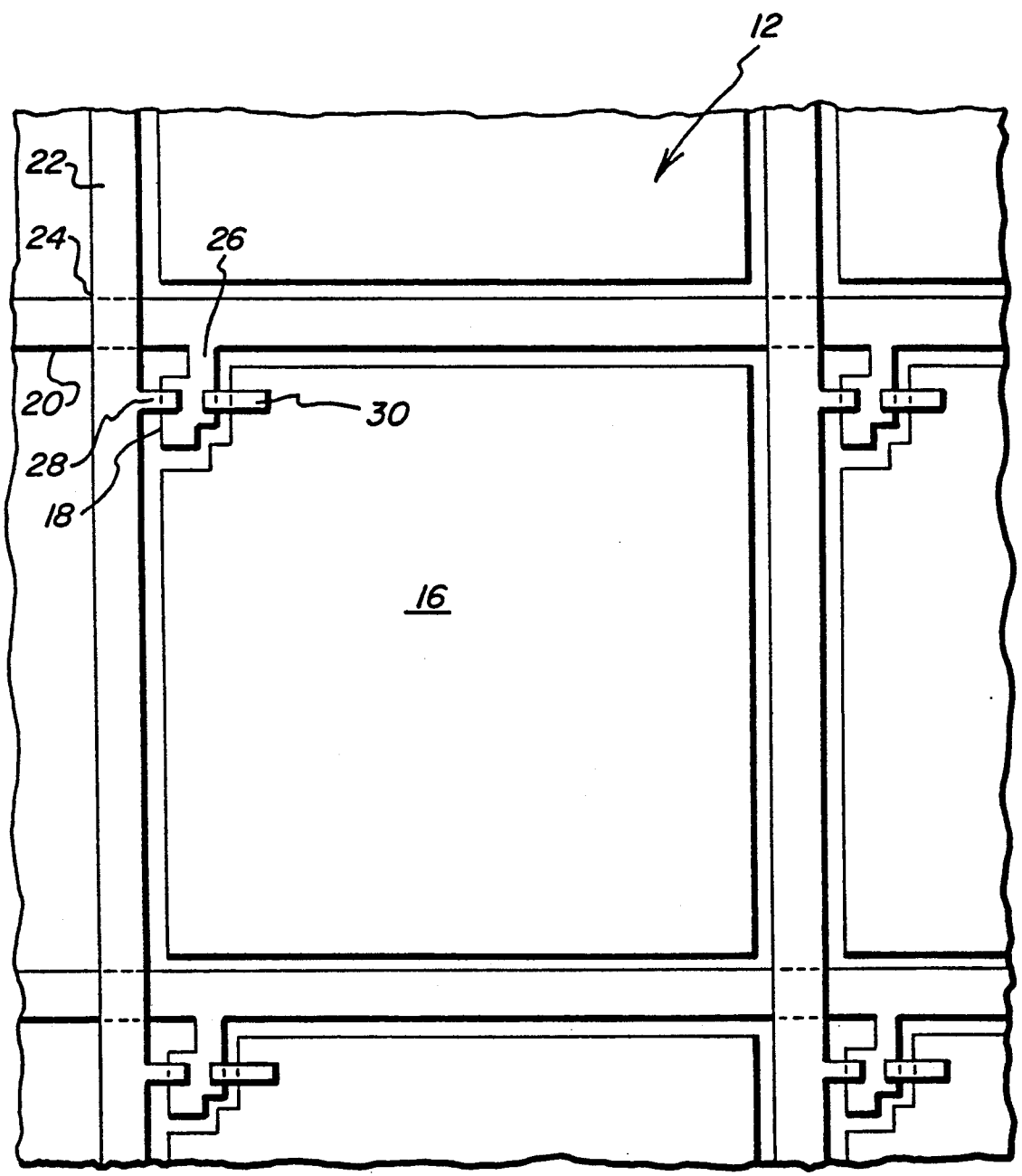
FIG. 2 is a detailed plan view of a portion of the liquid crystal display device of FIG. 1A.

Referring to FIG. 1A, an LCD device 10 includes a multiplicity 12 of picture elements or pixels which are formed on an insulated substrate 14, such as a flat glass panel or the like. Each pixel 12 (FIG. 2) includes a pixel electrode 16 of light-transmissive material, such as indium tin oxide (ITO) or the like, and a switching means 18 (typically a thin-film field-effect transistor (FET) or the like) for controlling the light transmissive characteristics of pixel 12. Electrical signals are communicated to the individual pixel FETs 18 by a plurality of X-address lines or scan lines 20 and a plurality of Y-address lines or data lines 22. The scan and data lines insulatively traverse each other at locations referred to as crossovers 24. Scan lines 20 are usually connected to gate electrodes 26 of pixel FETs 18 and data lines 22 are usually connected to source electrodes 28 of FETs 18. Drain electrode 30 of each FET 18 is typically connected to pixel electrode 16. A detailed disclosure of the pixel structure and operation is provided in application Ser. No. 07/373,433 filed June 30, 1989, which is incorporated herein by reference and is assigned to the same assignee as the present invention.

Referring back to FIG. 1A, a coverglass 32 is disposed over glass substrate 14 and pixels 12. Coverglass 32 is typically spaced from glass substrate 14 by the structure of each pixel FET 18 and a mechanical spacer (not shown), such as glass fibers, glass beads or the like, which is disposed between each pixel FET 18 and coverglass 32. Thus, a gap 38 is created by the spacing between coverglass 32 and glass substrate 14. Gap 38 typically has a width on the order of a few thousand angstroms and is shown in the figures to be much larger relative to the size of device 10 merely for convenience of explanation.

Referring to FIG. 1B, a seal 40 is formed essentially completely around the periphery of device 10 by filling gap 38 with a sealant material, such as an epoxy or an injection-moldable thermoplastic material, such as Lexan ® resin or Ultem ® resin (manufactured by the General Electric Company) and the like; seal 40 joins coverglass 32 and glass substrate 14 to provide a hermetic reservoir for liquid crystal material which will subsequently be introduced into the interior of device 10. Seal 40 is typically formed by placing the sealant material on the peripheral edges of either coverglass 32 or glass substrate 14, or on both and then disposing the coverglass and substrate in parallel facing alignment with each other. After seal 40 is heat cured, an opening 42 may be formed through coverglass 32 and electrode 34, or alternatively, an opening (not shown) may be formed in seal 40, to permit injection of the liquid crystal material into the interior of device 10. The interior of device 10 is typically evacuated to facilitate filling with the liquid crystal material; after filling, opening 42 is plugged with an epoxy plug 44. Contaminants, such as solvents and the like, can disperse into the liquid crystal material nearby aperture 42 when plug 44 is cured by heating the device. The contaminants can cause an increase in conductivity of the liquid crystal as well as disrupt the crystalline alignment and thus degrade the optical and electrical performance of the pixels in this area of the display.

Figure 3A:
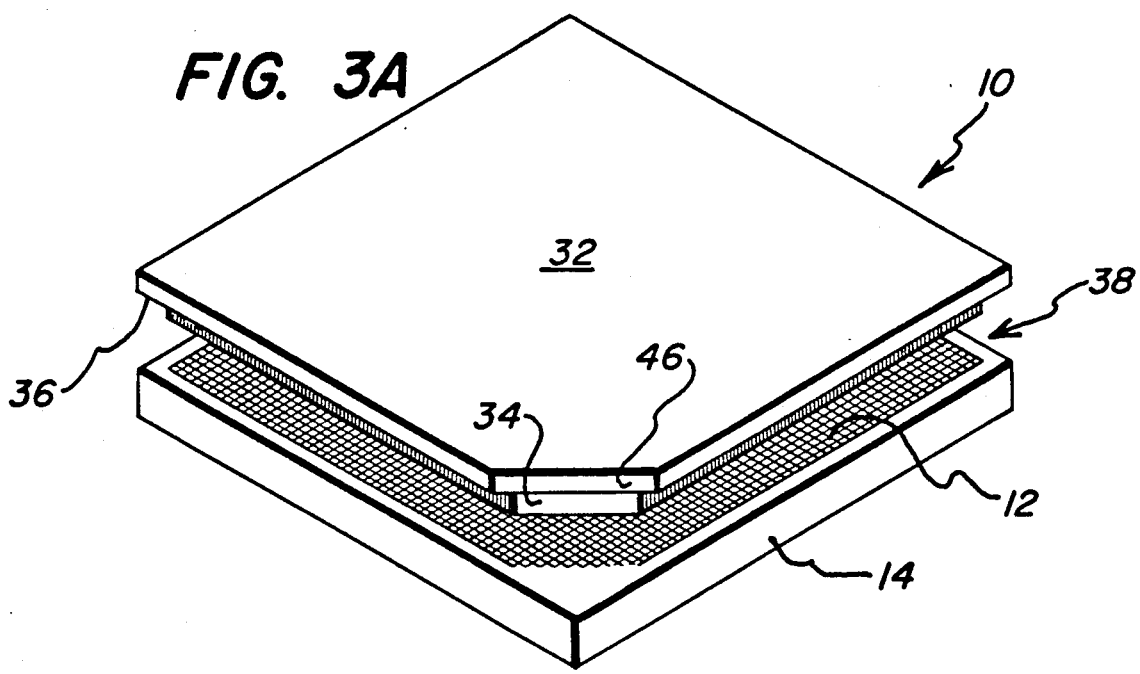
FIGS. 3A–3C are perspective views of the steps employed in a method for sealing an LCD device in accordance with the present invention.
Figure 3B:
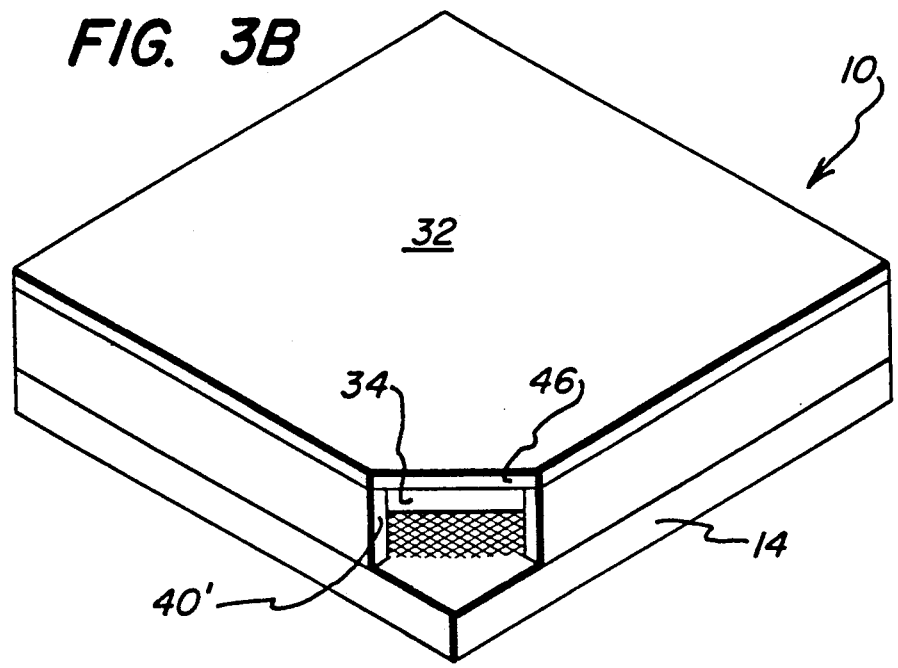

In accordance with the present invention, after pixels 12 are formed on substrate 14 by known techniques, one corner 46 of coverglass 32 or substrate 42, or both corresponding juxtaposed corners, may be cut off or otherwise shaped to facilitate later injection of liquid crystal material into device 10 and to facilitate sealing the device (FIG. 3A). Cut corner 46 may be squared-off and may be cut either before or after coverglass 32 is disposed over glass substrate 14 and either before or after a seal 40' is formed. Seal 40' (FIG. 3B) is formed between coverglass 32 and glass substrate 14 essentially completely around the periphery of device 10 except for an aperture or window 48 formed at squared-off device corner 46. The present invention could equally be practiced by forming a window through seal 40' in one of the side edges of device 10; however, the preferred method is to cut off corner 46 and form aperture 48 at this location. The interior of device 10 is evacuated and then filled with liquid crystal material through single aperture 48.

Figure 3C:
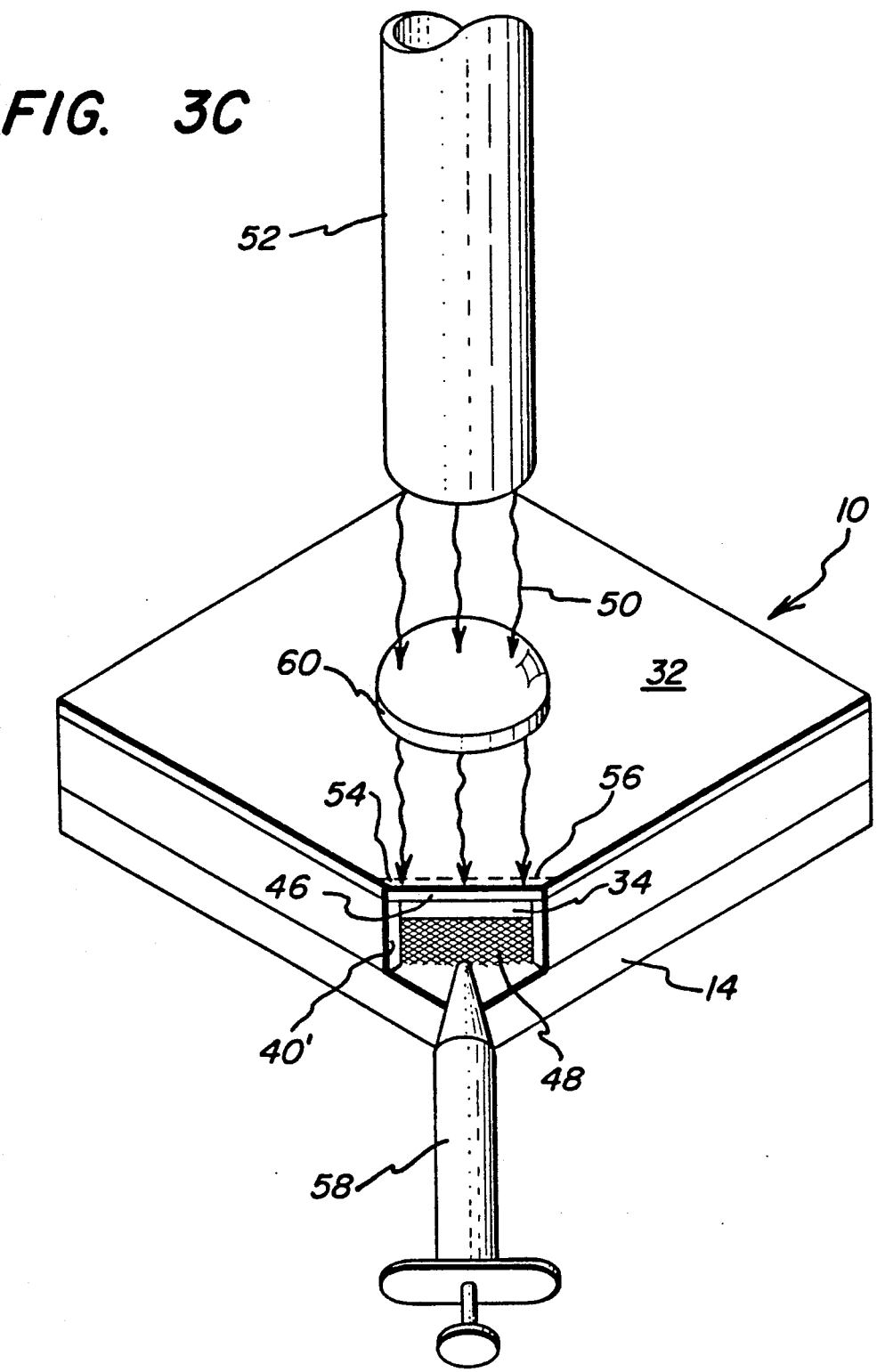

After introducing the liquid crystal material, electromagnetic radiation 50 (FIG. 3C), preferably ultraviolet (UV) light from a laser 52 or the like, is directed through a limited region 54 of device 10 shown bounded by squared-off corner 46 and broken line 56 in FIG. 3C; thus, the area of radiation 54 is substantially confined to the vicinity of squared-off corner 46 and aperture 48. Those skilled in the art will note that if device 10 is to operate with back lighting (device 10 is entirely light transmissive), then the radiation may be introduced from either side of the device; if device 10 is to operate by reflected light (coverglass 32 has a light reflective surface), then the radiation must be introduced from the light transmissive side of the device (glass substrate 14). While limited region 54 is being irradiated, a photoreactive, optical adhesive, such as Norland "UVS91" or the like, is injected into aperture 48 by injection means 58 which permits precise control of the placement of the optical adhesive. Injection means 58 may be a syringe or similar instrument. The optical adhesive will solidify substantially immediately, when irradiated by laser 52 operating at a selected wavelength and power, and will thus be confined to region 54 without contaminating the nearby liquid crystal material An argon-ion laser operating at a wavelength of about 351 nm. and a power of about 200 mW. may be used to irradiate region 54 with ultraviolet light and will cause the adhesive to solidify within about 0.5 seconds. The optical adhesive will bind with seal 40', coverglass 32 and substrate 14 at corner 46 to form a complete edge seal for device 10 which can withstand high humidity and high and low temperatures within a range of about 150° C. without breaking down or loss of adhesion. The low wattage at which an argon-ion laser may be operated to solidify the photoreactive adhesive will also prevent any damage to the device because of overheating.

A lens 60 may be employed to focus the UV radiation from laser 52 and further confine the boundaries of irradiated region 54. A 40 mm. cylindrical lens can be used to irradiate a rectangular shaped area measuring about 1 mm.×4 mm.

Figure 4:
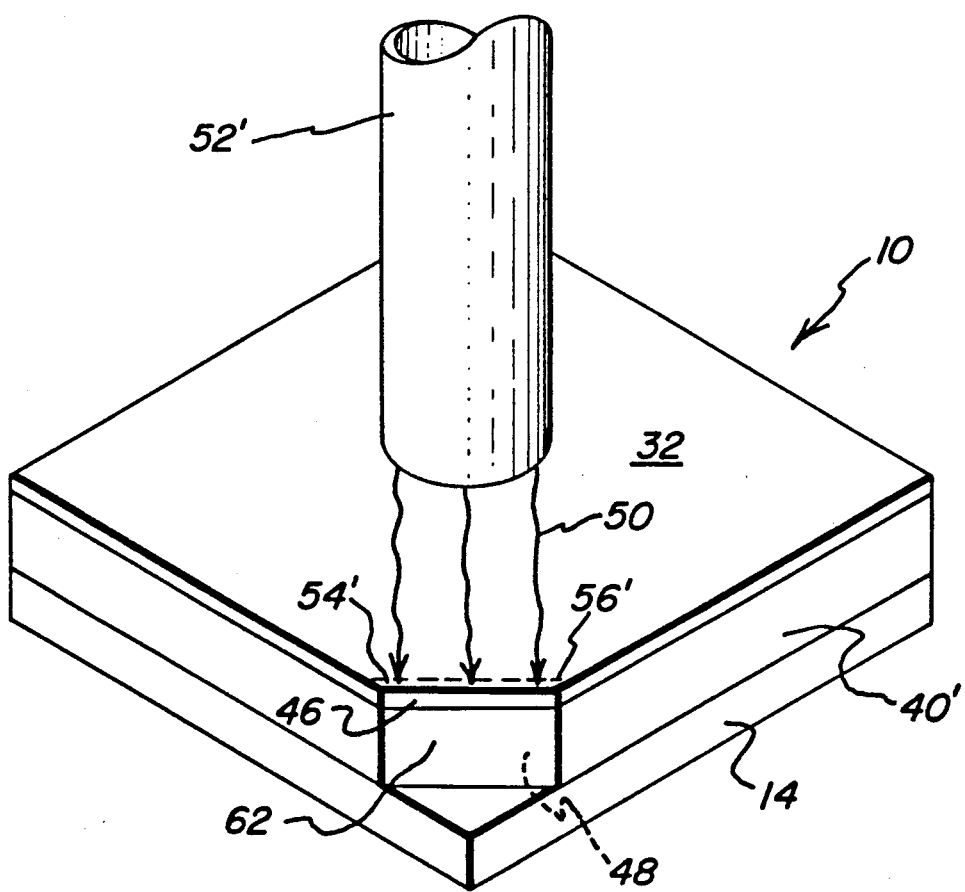
FIG. 4 is a perspective view of an alternate step employed in the method for sealing an LCD device in accordance with the present invention.

In an alternate embodiment, after seal 40' is formed and device 10 is filled with liquid crystal material, injection-moldable thermoplastic material, such as Lexan ® resin, Ultem ® resin or the like, may be inserted into aperture 48 to form a plug 62 (FIG. 4). The device 10 is then heat treated only in a localized area 54' bounded by squared-off corner 46 and broken line 56'. The heat treating is preferably carried out by focusing radiation on area 54' from an argon-ion laser operating at a wavelength of about 351 nm. and a power of about 200 mW. The laser heating causes at least the exterior of plug 62 to soften and become fluid; plug 62 resolidifies and binds with seal 40', coverglass 32 and glass substrate 14 when the heat is removed. Since the heating is confined to region 54', the thermoplastic does not migrate significantly beyond the heated region because it will resolidify rather quickly outside this zone. Plug 62 and seal 40' form an edge seal between glass substrate 14 and coverglass 32 which can withstand high humidity and a wide variation of temperature without cracking or losing adhesion.

In an alternate method, area 54' may be heat treated before inserting plug 62 into aperture 48. The laser heating will cause at least the exterior of plug 62 to soften and flow and the plug will resolidify and bond to seal 40', coverglass 32 and glass substrate 14 when the heat is removed.

The present invention could be practiced as well by forming an aperture through seal 40' in a side edge of device 10 without forming squared-off corner 46 and providing the aperture or window at this corner.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described in detail with respect to sealing a liquid crystal display device, the concepts could equally be applied to sealing other devices which contain a fluid and, while the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for sealing a fluid between spaced apart first and second members of a device, comprising the steps of:
   forming a seal of sealant material across a space between the first and second members and essentially completely around the periphery of the device;
   forming an aperture through the seal to provide access to an interior of the device;
   introducing the fluid into the device interior through the aperture;
   filling the aperture with a plug of thermoplastic material;
   selectively heat treating substantially only the plug to cause at least an exterior portion of the plug to soften and flow; and
   terminating the heat treatment after a duration sufficiently short to avoid contamination of said fluid, to cause the plug to resolidify and bind to a boundary of the aperture and complete the peripheral seal to completely enclose the fluid.

2. The method of claim 1 further comprising the step of cutting off a corner of at least one of the first and second members of the device to provide the aperture and to facilitate introducing the fluid.

3. The method of claim 1 wherein the sealant material is an injection-moldable thermoplastic resin.

4. The method of claim 1 wherein the sealant material is an epoxy.

5. The method of claim 1 wherein the device is a liquid crystal display device and the first and second members are respectively a substrate member and a cover member.

6. The method of claim 1 wherein the heat treating step comprises the step of focusing ultraviolet radiation on only the plug.

7. The method of claim 6 wherein the focusing step comprises the step of directing the ultraviolet radiation through a lens to irradiate only the plug.

8. The method of claim 6 wherein the ultraviolet radiation has a wavelength of about 351 nanometers.

9. The method of claim 8 wherein said duration is about 0.5 seconds.

10. A method for sealing a fluid between spaced apart first and second members of a device, comprising the steps of:

forming a seal of sealant material across a space between the first and second members and essentially completely around the periphery of the device;

forming an aperture through the seal to provide access to an interior of the device;

introducing the fluid into the device interior through the aperture;

irradiating substantially only the aperture of the device with electromagnetic radiation;

injecting a photosensitive adhesive into the aperture so as to expose said adhesive to said radiation and cause said adhesive to solidify and close the aperture; and terminating said electromagnetic radiation after a duration sufficiently short to avoid contamination of said fluid.

11. The method of claim 10 further comprising the step of cutting off a corner of at least one of the first and second members of the device to provide the aperture and to facilitate introducing the fluid.

12. The method of claim 10 wherein the sealant material is an injection-moldable thermoplastic resin.

13. The method of claim 10 wherein the sealant material is an epoxy.

14. The method of claim 10 wherein the device is a liquid crystal display device and the first and second members are respectively a substrate member and a cover member.

15. The method of claim 10 wherein the irradiating step comprises the step of focusing ultraviolet radiation on only the aperture.

16. The method of claim 15 wherein the ultraviolet radiation has a wavelength of about 351 nanometers.

17. The method of claim 15 wherein the focusing step comprises the step of directing the ultraviolet radiation through a lens to irradiate only the aperture area.

18. A method for sealing a fluid between spaced apart first and second members of a device, comprising the steps of:

forming a seal of sealant material across a space between the first and second members and essentially completely around the periphery of the device;

forming an aperture through the seal to provide access to an interior of the device;

introducing the fluid into the device interior through the aperture;

selectively heat treating substantially only the aperture;

filling the aperture with a plug of thermoplastic material to cause at least an exterior portion of the plug to soften and flow; and terminating the heat treatment after a duration sufficiently short to avoid contamination of said fluid, to cause the plug to resolidify and bind to a boundary of the aperture and complete the peripheral seal to completely enclose the fluid.

19. The method of claim 18 further comprising the step of cutting off a corner of at least one of the first and second members of the device to provide the aperture and to facilitate introducing the fluid.

20. The method of claim 18 wherein the device is a liquid crystal display device and the first and second members are respectively a substrate member and a cover member.

21. The method of claim 18 wherein the heat treating step comprises the step of focusing ultraviolet radiation on only the aperture.

22. The method of claim 21 wherein the focusing step comprises the step of directing the ultraviolet radiation through a lens to irradiate only the aperture.

23. The method of claim 21 wherein the ultraviolet radiation has a wavelength of about 351 nanometers.

24. The method of claim 23 wherein said duration is about 0.5 seconds.

* * * * *